United States Patent [19]

Sugama

[11] Patent Number: 5,246,496
[45] Date of Patent: Sep. 21, 1993

[54] PHOSPHATE-BONDED CALCIUM ALUMINATE CEMENTS

[75] Inventor: Toshifumi Sugama, Mastic Beach, N.Y.

[73] Assignee: Associated Universities, Inc., Washington, D.C.

[21] Appl. No.: 970,161

[22] Filed: Nov. 2, 1992

Related U.S. Application Data

[63] Continuation of Ser. No. 745,536, Aug. 15, 1991, abandoned.

[51] Int. Cl.[5] .............................................. C04B 7/32
[52] U.S. Cl. .................................... 106/690; 106/692
[58] Field of Search ............... 106/690, 692, 691, 693, 106/694; 501/124

[56] References Cited

U.S. PATENT DOCUMENTS

| | | | |
|---|---|---|---|
| 2,081,802 | 12/1934 | Eklund | 106/723 |
| 2,391,493 | 12/1945 | Wainer et al. | 106/690 |
| 3,677,780 | 7/1972 | Nishi et al. | 106/723 |
| 3,717,488 | 2/1973 | Magnon | 106/723 |
| 3,885,979 | 5/1975 | Rio et al. | 106/89 |
| 4,076,545 | 2/1978 | Azuma et al. | 423/544 |
| 4,126,475 | 11/1978 | Hansen et al. | 106/118 |
| 4,187,118 | 2/1980 | Nakagawa et al. | 106/89 |
| 4,230,499 | 10/1980 | Nakagawa et al. | 106/90 |
| 4,338,135 | 7/1982 | Cook | 106/97 |
| 4,436,555 | 3/1984 | Sugama et al. | 106/85 |
| 4,459,156 | 7/1984 | Henslee et al. | 106/85 |
| 4,670,055 | 6/1987 | Koslowski | 106/104 |
| 4,683,003 | 7/1987 | Nakano et al. | 106/315 |
| 4,915,740 | 4/1990 | Sakai et al. | 106/104 |

OTHER PUBLICATIONS

"$P_2O_5$—$H_2O$", Cement and Concrete Research, 18, 103-108 (1988).

Sugama et al., "Strength Development in Phosphate Bonded Calcium Aluminate Cements", J. Am. Ceram. Soc., 74(5), 1023-30 (1991).

Hattori et al., "Hydrothermal Preparation of Calcium Y. Hydroxyapatite Powders", J. Am. Chem. Soc., 73(6), 1803-805 (1990).

Steinke et al., "Reactions and Bonding of Sol-Gel Derived Chemically Bonded Ceramics in the System CaO—$P_5O_5$—$SiO_2$", Advanced Cements and Chemically Bonded Cements, MRS Int'l Mtg. on Adv. Mat'ls, 13, 229 (1989).

Hu et al., "Investigation of Hydration Phases in the Systems CaO—$SiO_2$—$P_5O_5$—$H_2O$", J. Mater. Res., 3, 772-780 (1988).

Hu et al., "Studies of Strength Mechanism in the Newly Developed Chemically Bonded Ceramics in the System CaO—$SiO_2$".

Primary Examiner—Mark L. Bell
Assistant Examiner—Paul Marcantoni
Attorney, Agent, or Firm—Margaret C. Bogosian

[57] ABSTRACT

A method is described for making a rapid-setting phosphate-bonded cementitious material. A powdered aluminous cement is mixed with an aqueous solution of ammonium phosphate. The mixture is allowed to set to form an amorphous cementitious material which also may be hydrothermally treated at a temperature of from about 120° C. to about 300° C. to form a crystal-containing phosphate-bonded material. Also described are the cementitious products of this method and the cement composition which includes aluminous cement and ammonium polyphosphate.

17 Claims, 4 Drawing Sheets

PHOSPHATE-BONDED CALCIUM ALUMINATE CEMENTS

This invention was made with Government support under contract number DE-AC02-76CH00016, between the U.S. Department of Energy and Associated Universities, Inc. The Government has certain rights in the invention.

RELATED APPLICATIONS

The instant application is a continuation of co-pending application Ser. No. 745,536 filed Aug. 15, 1991, now abandoned.

BACKGROUND OF THE INVENTION

The invention relates to a method for preparing chemically bonded cementitious materials, particularly phosphate-bonded calcium aluminate cements.

Non-hydraulic, magnesium phosphate cements have been described in U.S. Pat. No. 4,436,555 to Sugama et al. These magnesium phosphate cements (MPC) are derived by mixing magnesium oxide as a bivalent cation-releasable solid and aqueous ammonium polyphosphate (Poly-N) as a cement-forming solution. The chemical reaction between the MgO solid and Poly-N liquid generates high levels of activation energy resulting in rapid setting. Subsequent heating of the cement results in anhydrous magnesium orthophosphate. A shortcoming of this MPC material is the susceptibility of nonreactive MgO remaining in the cement to hydrolysis leading to expansion, decomposition and reduction in strength.

It has now been discovered that the utilization of calcium aluminate cement as a solid reactant in phosphate-bonded cementitious materials avoids such hydrolytic deterioration. With this cement, the species of bivalent cation reacting with aqueous ammonium polyphosphate is calcium.

Calcium aluminate cements have been manufactured, for example, by heating until molten or sintering a mixture of limestone and bauxite with a small amount of $SiO_2FeO$ and $TiO_2$. These cements are extensively used for refractory concretes. Calcium aluminate cement is commercially available as, for example, Lumnite and Refcon, both supplied by the Lehigh Cement Co. of Allentown, Pa.

Calcium aluminate cements have commonly been used in hydraulic cements which usually contain lime, alumina and silica hardened with a mixture of water. For example, U.S. Pat. No. 4,915,740 to Sakai et al. describes a hydraulic cement which contains as a main ingredient, calcium alumina cement containing ultra-fine particles, a metal aggregate, an organic acid plasticizer and a phosphoric acid ester as a set adjusting agent. A molded article may be cured in high pressure in water and dry cured.

U.S. Pat. No. 4,683,003 to Nakano et al. discloses production of cellular concrete from a mixture of an aqueous slurry of calcium silicate, an aqueous slurry of calcium aluminate, with a hydroxycarboxylic acid setting retarder in both slurries, and an aqueous foaming agent.

Portland cement is another much-used hydraulic cement made by mixing alumina and calcium oxide and burning. Various formulations for Portland cement are described, for example, in U.S. Pat. Nos. 4,230,499; 4,187,118; 3,885,979; 3,717,488 and 3,677,780. Aluminous, i.e. high alumina, cements contain at least 30–35% alumina, in contrast to Portland cement which contains less than 5% alumina. Aluminous cement attains its maximum strength more rapidly than Portland cement and is more resistant to solutions of sulfates.

In other advances using alumina and calcium oxides or hydroxides, U.S. Pat. No. 4,670,055 to Koslowski describes a method for controlling quick setting of a mixture of alumina cement and calcium hydroxide by premixing the aluminate with an organic acid and calcium sulfate. U.S Pat. No. 4,076,545 to Azuma et al. describes calcium aluminate monosulfate hydrate building materials made by mixing calcium oxide, alumina, calcium sulfate and water at 100°–200° C. and under pressure. There is no phosphate bonding in these preparations.

Metal oxides such as FeO have been known to increase strength in building components. U.S. Pat. No. 4,126,475 to Hansen et al. discloses a steam-cured compressed mixture of laterite (aluminum oxide, 4–50 weight percent iron oxide, and silicon oxide) lime (CaO) and water. Reacted iron oxide forms supplementary binding in the product. U.S. Pat. No. 4,459,156 to Henslee et al describes a mortar composition of $MgAl_2O_4$ spinels and aluminum phosphate or polyphosphates. U.S. Pat. No. 2,391,493 to Wainer et al. describes casting compositions of an inert material such as sand, acid phosphate, magnesia containing iron oxide and a fluoride.

Chemically bonded ceramics in the $Ca-SiO_2-P_2O_5-H_2O$ (hydroxy apatite) quaternary system have been prepared using calcium nitrate, lactate, phosphoric acid and silica, hydrated at 85° C.–300° C., as reported Hu, J., et al., "Studies of Strength Mechanism in the Newly Developed Chemically Bonded Ceramics in the System $CaO-SiO_2-P_2O_5-H_2O$", Cement and Concrete Research 18, 103–108 (1988) and Hu et al., "Investigation of Hydration Phases in the System $CaO-SiO_2-P_2O_5-H_2O$", Journal of Materials Research 3, 772 (1988). The preparation of hydroxy apatite from $Ca_2P_2O_7$; and CaO under hydrothermal conditions has been described by T. Hattori et al., "Hydrothermal Preparation of Calcium Hydroxyapatite Powders" J Am. Chem. Soc. 73(6) 1803–805 (1990). An article by R. A. Steinke, et al., "Reactions and Bonding of Sol-Gel Derived Chemically Bonded Ceramics in the System $CaO-P_2O_2-SiO_2$", Advanced Cements and Chemically Bonded Cements, MRS Int'l On Adv. Mats., 13, 229 (1989), also reports hydroxyapatites formed by sol-gel preparation of compositions of calcium nitrate, silica and phosphoric acid. Pressed powders were cured at 35° C. and 90° C. under pressure. These articles describing hydroxyapatite do not suggest the use of calcium aluminate cement and their compositions do not attain the high strengths of the present invention.

Therefore, it is an object of the present invention to utilize interaction processes and reaction products occurring between ammonium polyphosphate and calcium aluminate cement.

It is another object of the invention to provide rapid-setting material which can be used for concrete bridge-decks, highways and airport runways and for their rapid repair.

It is a further object to provide phosphate-bonded cement which avoids expansion, decomposition and reduction in strength resulting from hydrolysis of unreacted metal oxides within the cement.

It is yet another object to provide an economical cementitious material with high compression strength.

It is still another object to provide an economical cementitious material using readily available commercial materials.

It is an object of the invention to provide phosphate-bonded calcium aluminate cements.

SUMMARY OF THE INVENTION

Accordingly, there is provided a method of making a rapid-setting, phosphate-bonded cementitious material by mixing from about 80 to about 20 weight percent of a powdered aluminous cement and from about 20 to about 80 weight percent of an aqueous solution of ammonium phosphate and allowing the mixture to harden. An amorphous cementitious material containing ammonium calcium pyrophosphate is formed. This amorphous cementitious material may be used as a rapid-setting cement or it may be further subjected to hydrothermal treatment to obtain a crystal-containing cementitious material with high compression strength.

There is also provided a cement composition comprising a cation-leachable power which includes aluminous cement, and a bivalent metallic ion accepting liquid which includes ammonium phosphate. This mixture, forming ammonium calcium pyrophosphate ($NH_4CaP_2O_7$) may be used as a rapid-setting cement. Hydrothermal treatment of this pyrophosphate, however, leads to a phase transformation into crystalline hydroxyapatite $Ca_{10}(PO_4)_6(OH)_2$ yielding cement with high compression strength.

Phase transformations and microstructural developments occur for the phosphate-bonded cement under atmospheric, room temperature conditions and hydrothermal conditions up to 300° C.

For a better understanding of the present invention, together with other and further objects, reference is made to the following description, taken together with the accompanying figures, and its scope will be pointed out in the appended claims.

DETAILED DESCRIPTION OF THE INVENTION

High strength rapid-setting phosphate-bonded cementitious materials which are not susceptible to hydrothermal-induced hydrolysis are prepared by mixing aluminous cement as a bivalent metallic cation source and a bivalent metallic ion-accepting phosphate-containing liquid such as an aqueous solution of diammonium phosphate and ammonium polyphosphate as the phosphate source. For purposes of convenience, the mixing may be carried out at ambient (room) temperatures or the mixing may be carried out at a temperature range from about −25° C. to about 50° C. limited only by the freezing point or boiling point of the reactants.

The term aluminous cement as used herein may be defined as a high alumina cement containing among other things, at least about 32 wt. % alumina $Al_2O_3$, and also an alkaline earth metal oxide, e.g. CaO. A suitable aluminous cement is calcium aluminate cement. Aluminous cements useful herein are in the form of a powder with an average particle size of from about 10 to about 200 microns.

Commercially available sources may be used for the calcium aluminate cement and the diammonium phosphate and ammonium polyphosphate. A useful phosphate source of this type is a fertilizer such as Poly-N which yields $NH_4H_2PO_4$ in aqueous solution. Examples of useful calcium aluminate cements are Lumnite and Refcon.

The calcium aluminate cement may be added in a proportion of about 80 to about 20 weight percent, preferably from about 70 to about 50 weight percent. The phosphate source may be added in a proportion of from about 20 to about 80 weight percent, preferably from about 30 to about 50 weight percent.

Various additives as are known to those skilled in the art may also be added, for example, aggregates such as silica (sand), gravel and crushed rock. Other additives may be organic or inorganic set retardants such as non-limiting examples, glucuronic-6,3-lactone, gluconic acid, boric acid, sodium tetraborate and decyhydrate (borax).

The phosphate-bonded calcium aluminate cement cementitious materials may be prepared by mixing the two major components. One component as a solid reactant is high alumina cement which may include, for example, 46.5–35.0 wt. % $Al_2O_3$, 45.0–35.5 wt. % CaO and 1.0–2.0 wt. % $SO_3$; also 9.0–6.0 wt % $Fe_2O_3$, 9.0–3.5 wt. % $SiO_2$, 1.0–0.3 wt. % MgO, and 1.5–2.5 wt. % $SiO_2$. The other component is a liquid reactant such as ammonium polyphosphate fertilizer which may include, e.g. 11.1 wt. % ammoniacal nitrogen, 37.0 wt. % $P_2O_5$, and 50.79 wt. % water.

The chemical reaction between calcium aluminate cement (CAC) and $NH_4H_2PO_4$ - based solution causes the formation of ammonium calcium pyrophosphate (AmCPP) $NH_4CaP_2O_7$ as an amorphous cementitious phase. This phase is responsible for the development of strength in the rapid-setting phosphate-bonded cement after setting at ambient temperatures. Subsequent hydrothermal treatment leads to phase transformation of the ammonium calcium pyrophosphate and calcium aluminate cement into crystalline hydroxyapatite (OHAp) as a major phase and anorthite (AN) as a minor phase with some boehmite (BO). The moderate growth of these interlocked crystals in the interspaces of amorphous ammonium calcium pyrophosphate phases plays an important role in creating a dense microstructure, thereby conferring a very high strength to the resulting phosphatebonded cement.

To prepare the rapid-setting cement, powdered calcium aluminate as the solid reactant and aqueous ammonium phosphate-based solution are mixed. After mixing, the cement may be cast and allowed to harden at room temperature, in air, for a time of at least about 3 minutes to several days, preferably at least 30 minutes, more preferably, at least one hour at a temperature range of, for example, about −25° C. to about 50° C., preferably about −10° C. to about 45° C. The resulting cementitious body may be used as is or further subjected to hydrothermal conditions of from about 120° C. to about 300° C. preferably from about 150° C. to about 225° C., most preferably about 190° C.–210° C., for a time of about one hour to about three days, resulting in cementitious material having a high compression strength.

Infrared (IR) analysis confirms the compositions of the chemical reactants and reaction products when calcium aluminate cement and Poly-N solution are mixed in this manner. This analysis indicates that the major component of Poly-N is ammonium dihydrogen monobasic orthophosphate (AmDHOP), $NH_4H_2PO_4$. When Poly-N is incorporated into calcium aluminate cement, the IR spectrum shows diminution of peak intensity originating from the P=O frequency, the elimination of bands corresponding to $H_2PO_4$ and new bands associated with the vibrational characteristics of pyrophosphate ($P_2O_7$) compositions and $P_2O_7$ groups with edge-sharing alkali metal. This indicates that the ammonium dihydrogen monobasic orthophosphate and calcium aluminate cement are transformed into ammonium calcium pyrophosphate (AmCPP) compounds, $(NH_4)_2Ca(P_2O_7) \cdot x H_2O$, having a tetrahedral phosphate structure.

An optional but advantageous factor in the subsequent high conversion rate of ammonium calcium pyrophosphate to hydroxyapatite at a relatively low hydrothermal temperature of about 200° C. is the catalytic activity of $NH_3$ emitted from decompositions of ammonium calcium pyrophosphate and byproduct ammonium sulfate formed in the reaction. Sulfite may be present in minor amounts in calcium aluminate cement so that sulfate ions dissociate from the calcium aluminate cement in aqueous solution. Consequently, ammonium sulfate $(NH_4)_2SO_4$, is present as a byproduct of the interactions of ammonium dihydrogen monobasic orthophosphate and calcium aluminate cement. As reported by T. Hattori, "Hydrothermal Synthesis of Hydroxyapatite from Calcium Pyrophosphate", *J. Mater. Sci. Lett.*, 8, 305 (1989), the introduction of $NH_3$ in the autoclave promotes hydrothermal reaction rates of hydroxyapatite derived from calcium pyrophosphate. $NH_3$ emitted from the conversion of amorphous calcium pyrophosphate and $(NH_4)_2SO_4$ promotes the conversion rate of amorphous calcium pyrophosphate to hydroxyapatite. Such catalytic activity of $NH_3$ plays a role in causing the formation of hydroxyapatite at a relatively low hydrothermal temperature of about 200° C.

X-ray photoelectron spectroscopy of the interfacial zone of interaction between ammonium dihydrogen monobasic orthophosphate and calcium aluminate cement shows that while $Ca^{2+}$, $SO_4^{2-}$ and $Al(OH)_4$ ions dissociate from calcium aluminate cement in aqueous phase, ammonium dihydrogen monobasic orthophosphate preferentially reacts with $Ca^{2+}$ and $SO_4^{2-}$ ions rather than with $Al(OH)_4$. Correlating this with the formation of ammonium calcium pyrophosphate described above as the major ammonium reaction product, other ammonium byproducts also form from the interactions of ammonium dihydrogen monobasic orthophosphate, $NH_4H_2PO_4$ with calcium aluminate cement and these byproducts include formations of ettringite, $Ca_6Al_2(SO_4)_3(OH)_{12} \cdot 26 H_2O$ and ammonium sulfate, $(NH_4)_2SO_4$.

When IR spectra of the phosphate-bonded cement hardened at 25° C. are compared with IR spectra for phosphate-bonded cement subjected to hydrothermal treatment, striking differences are noted in their spectral features. In 200° C./20 hour autoclave specimens as compared with 25° C./one hour aged specimens, there is complete elimination of all IR bands due to $NH_4$ ions, a reduction in intensity of tetrahedral pyrophosphate-related frequencies, a disappearance of a band which reflects remaining calcium aluminate cement reactants, and the development of a new band which relates to the formation of a typical tetrahedral orthophosphate structure.

This clearly shows that ammonium calcium pyrophosphate formed as cementitious phase at room temperature is transformed into calcium orthophosphate compounds during exposure to hydrothermal conditions. The IR spectrum structure of 300° C.-autoclaved samples, on the other hand shows that the increased temperature contributes to new bands corresponding to the formation of hydration products of CAC in the presence of the hydrothermally transformed calcium orthophosphate compounds.

Comparing X-ray diffraction patterns of CAC reactant and 25° aged and autoclaved phosphate-bonded cement, there are no significant differences between the XRD patterns for the CAC reactant and the 25° C./one hour aged PBC samples denoting that the ammonium calcium pyrophosphate compounds formed at room temperature are essentially an amorphous phase. The pattern of cement autoclaved at 150° C., is also amorphous, similar to that of the CAC. After autoclaving at 200° C. for about 20 hours, however, several new spacing develop and the CAC-related spacings diminish. These new spacings reveal the formation of two different crystal compounds: hydroxyapatite (HOAp), $Ca_{10}(PO_4)_6(OH)_2$ as a major phase and anorthite (AN), $CaAl_2Si_2O_8$, as a minor one. Recent findings also reveal the presence of boehmite (BO) AlOOH.

The microstructure in the phosphate bonded cement setting at room temperature exhibits porous and fragmentary features corresponding to an amorphous calcium pyrophosphate phase. But a dramatic alteration occurs when the PBC is treated in an autoclave at from above 150° C. to about 250° C., preferably about 200° C.: the numerous voids existing in the pastes setting at room temperature become filled by crystalline structures which are composed of hydroxyapatite and anorthite. At higher autoclave temperatures of about 300° C., however, the dense microstructure of the cementitious body formed at 200° C. is changed into a porous microstructure with decreased compression strength.

Table I summarizes the hydrothermal-induced phase transformations of amorphous ammonium calcium pyrophosphate (AmCPP) cementitious material produced by mixing ammonium dihydrogen monobasic orthophosphate (AmDHOP) solution and calcium aluminate cement (CAC) powder at 25° C. and the products resulting after hydrothermal treatment.

TABLE I

| Phase Transformations of Rapid Setting PBC Cementitious Materials Derived from the Primary Reactants Consisting of AmDHOP and CAC | | | |
|---|---|---|---|
| Temperature | Condition | Major Phase* | Minor Phase* |
| 25 | Air | AmCPP + CAC | |

TABLE I-continued

Phase Transformations of Rapid Setting PBC Cementitious Materials Derived from the Primary Reactants Consisting of AmDHOP and CAC

| Temperature | Condition | Major Phase* | Minor Phase* |
|---|---|---|---|
| 150 | Autoclave | AmCPP + CAC | |
| 200 | Autoclave | HOAp | AN + CAC + AmCPP + BO |
| 300 | Autoclave | HOAp + AN + BO | |

*AmCPP is amorphous calcium pyrophosphate
CAC is calcium aluminate cement reactant
HoAp is hydroxyapatite
AN is anorthite
BO is boehmite Moderate growth of interlocked hydroxyapatite, anorthite and boehmite crystals in the interspaces of amorphous ammonium calcium pyrophosphate and the resulting dense microstructure contributes to very high compression strength to over 70 MPa in the phosphate-bonded cement.

At hydrothermal treatment temperatures lower or higher than the desired range, the compression strength is lessened. At the lower temperatures, the crystalline phases do not form. At higher temperatures, an excessive crystal growth causes the elimination of noncrystalline phases and the formation of a porous structure resulting in a loss in strength.

The following examples illustrate the invention.

EXAMPLE 1

Neat cement pastes were prepared by mixing as primary reactants 60 wt. % calcium aluminate (CAC) powder (Lumnite, Lehigh Cement Company, Allentown, Pa., analysis 45.6 wt. % $Al_2O_3$, 35.5 wt. % CaO, 6.0 wt. % $Fe_2O_3$, 8.5 wt. % $SiO_2$, 0.7 wt. % MgO and 2.0 wt. % $SO_3$) and 40 wt. % ammonium polyphosphate fertilizer solution (Poly-N, fertilizer grade: 11-37-0, Arcadian Corporation, Parsippany, N.J., analysis 11.1 wt. % ammoniacal N, 37.0 wt. % $P_2O_5$, 0.16 wt. % Fe 0.11 wt. % MgO, 0.12 wt. % $Al_2O_3$, 0.12 wt. % F, 0.6 wt. % S, 50.79 wt. % water) at room temperature. After the two primary reactants were thoroughly hand-mixed in a bowl for one minute, samples were cast in cylindrical molds 30mm diameter X 70mm long and allowed to harden at 25° C. in air, for up to 7 days.

EXAMPLE 2

Infrared (IR) Analysis of

Interaction Products at Room Temperature

To prepare for IR analysis of the reactants and chemical reaction products of Examples 1, disks were prepared by mixing 200 mg of KBr and 3 to 5 mg of reactants and powdered products of Example 1 that had been crushed to a size less than 0.074 mm. A spectrometer (Model 257, Perkin-Elmer, Norwalk, Conn.) was used for the IR analysis. IR spectra for the CAC and poly-N reactants and the 25° C./1-h-aged PBC samples are shown in FIG. 1.

Figure 1:
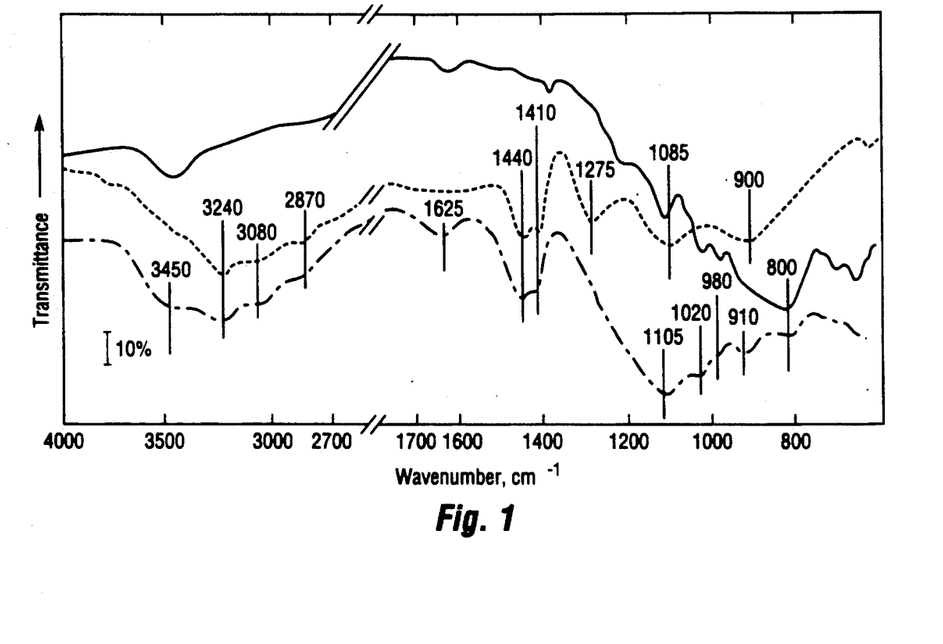
FIG. 1 is a comparison of infrared spectra of reactants and reaction products described in Example 2.

FIG. 1 shows the IR spectra for the CAC and Poly-N reactants, and the 25° C./1-h-aged PBC samples over two frequency ranges: 4000 to 2700 $cm^{-1}$ and 1700 to 600 $cm^{-1}$. In the IR absorption spectrum of CAC (the solid line), the indication of the stretching and bending vibration modes of HO bonds near 3400 and 1620 $cm^{-1}$, respectively, suggested that the CAC powders were already partially hydrated. The features of the spectrum (a dotted line) for solid materials remaining after the removal of aqueous phase from the Poly-N solution heated at 120° C. clearly demonstrated that the major component of Poly-N is ammonium dihydrogen monobasic orthophosphate (Am DHOP), $NH_4H_2PO_4$. According to the literature, D.E.C. Cortbridge and E. J. Lowe, "The Infrared Spectra of Some Inorganic Phosphorus Compounds", J. Chem. Soc., 493 (1954) and C. A. Hogarth and G. R. Moridi, "Infrared Spectra of Copper-Calcium-Phosphate Glasses," J. Mater. Sci. Lett., 3, 481 (1984), the assignment of IR bands at 3240, 3080 and 2870 $cm^{-1}$ is due to NH stretching vibration within the AmDHOP. This ammonium salt also gives two absorptions at 1440 and 1410 $cm^{-1}$, which can be ascribed to the $NH_4^+$ ions. The stretching mode of P=O double bonds is represented by a band at 1275 $cm^{-1}$. The two broad bands at 1085 and 900 $cm^{-1}$ correspond to the ionic P-O stretching in the $H_2PO_4$.

When Poly-N was incorporated into the CAC, the IR spectrum shown with a dashed line exhibited three different features, compared with those of Poly-N and CAC: (1) the appearance of new bands at 1105, 1020, 980 and 910 $cm^{-1}$, (2) the considerable dimution of peak intensity at 1275 $cm^{-1}$ originating from the P=O frequency, and (3) the elimination of bands at 1085 and 900 $cm^{-1}$ corresponding to $H_2PO_4$. The bands in two frequency regions, 1150 to 1050 $cm^{-1}$ and 1050 to 920 $cm^{-1}$, are associated with the vibrational characteristics of pyrophosphate ($P_2O_7$) compositions and $P_2O_7$ groups with edge-sharing alkali metal, respectively as reported, e.g. by B. Bridge and N. D. Patel, "Composition Dependence of the Infra-red Absorption Spectra of Molybdenum Phosphate Glasses and Some Crystalline Analogues, J. Non-Cryst Solids, 91, 27 (1987). The results, therefore, indicate that the AmDHOP was transformed into ammonium calcium pyrophosphate (AmCPP) compounds, $(NH_4)_2Ca(P_2O_7)\cdot xH_2O$, having a tetrahedral phosphate structure formed by the rupture of P=O bonds in AmDHOP. The remaining bands at 3450, 1625 and 800 $cm^{-1}$ in the spectrum appear to be due to cement hydrations.

EXAMPLE 3

X-ray Photoeloectron Spectroscopy

To gain a better understanding of the interactions between the AmDHOP and CAC, the interfacial zone was explored using XPS. Calcium aluminate cement powder was pressed at 100 MPa into a disk 12 mm in diameter and 0.5 to 1.0 mm thick to form CAC disks. A thin film of Poly-N (Arcadian Corp., Parsippany, NJ, fertilizer grade: 11-37-0) (ammonium dihydrogen monobasic orthophosphate, AmDHOP) was deposited on the CAC disk surfaces by dipping the disks for 5 seconds into 1.0%, 3.0% and 5.0% AmDHOP solutions. The samples were left in air at room temperature for one hour and then dried for one hour in an oven at 110° C. These Am DHOP film -covered CAC disk samples were subsequently analyzed by X-ray Photoelectron Spectroscopy (XPS). The exciting radiation was provided by a AlKα X-ray source operated at a constant power of 200 W (10 kv, 20 mA). The vacuum in the analyzer chamber of the instrument was maintained at $10^{-9}$ torr (about $1.33 \times 10^{-7}$Pa) throughout the experiments.

Preliminary examinations of wide-scan XPS spectra for all samples revealed the presence of an $Al_{2p}$ core-level peak with a substantial intensity, thereby suggesting that a certain area of the CAC disk surface was coated with a layer of AmDHOP film no thicker than 5 mm, which corresponds to the escape depth of aluminum photoelectrons.

Figure 2:
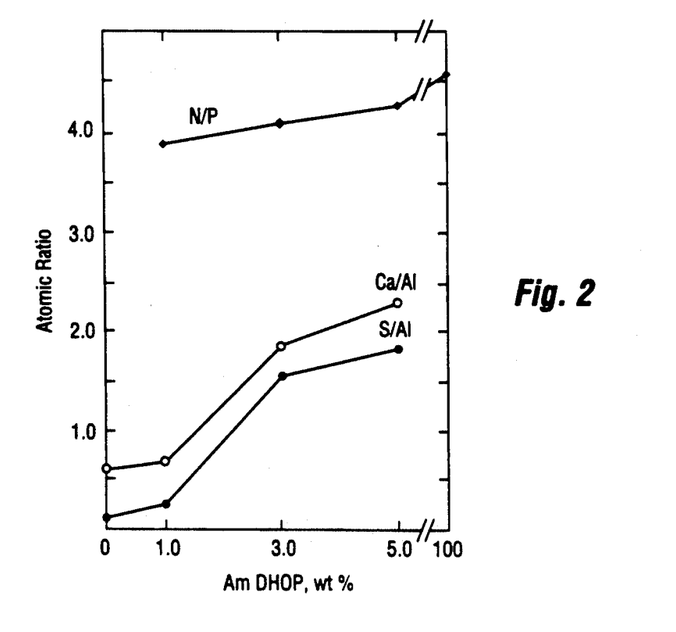
FIG. 2 is a graph of N/P and S/Al atomic ratios at the surface and interface of CAC covered with various concentrations of AmDHOP.

FIG. 2 shows the variations in atomic ratios of nitrogen to phosphorous N/P, calcium to aluminum Ca/Al, and S/Al atomic ratios as a function of the concentrations of AmDHOP. The proportional ratios of these atoms were obtained from the XPS $N_{1s}$, $P_{2p}$, $Ca_{2p3/2}$, $Al_{2p}$ and $S_{2p}$ peak areas which can be converted into elemental concentrations by means of the differential cross section for individual core-level excitations. As shown, both the Ca/Al and S/Al ratios markedly increase with the increase in AmDHOP contents up to 5.0 wt. %, while the N/P ratio, which reflects on the proportion of $NH_4$ to $PO_4$ components, gradually falls with the decrease in the coverage by AmDHOP. Since the Ca, S and Al atoms are associated with the $Ca^{2+}$, $SO_4^{2-}$, and $Al(OH)_4$ ions dissociate from the CAC in an aqueous phase as reported by J. D. Birchall, "The Nature and Role of the Matrix in Cement/Fiber Composites", pp. 25-35 in *Advances in Cement-Matrix Composites*. Proceedings of the Materials Research Society Annual Meeting, Nov. 17-18, Ed D. M. Roy, et al., Materials Research Society, Pittsburgh, PA, 1980, these data verify that the AmDHOP adjacent to the hydrated CAC surfaces preferentially reacts with the $Ca^{2+}$ and $SO_4^{2-}$ rather than $Al(OH)_4$. By comparison with that of bulk AmDHOP, the slight decrease in N/P ratio for the samples covered with 1.0% AmDHOP suggests that a certain amount of ammonium related compounds still remain in the interfacial regions. Relating this to the earlier IR result described in Example 2, the production of the major ammonium compound corresponds to the formation of AmCPP. However, assuming that the other ammonium compounds may form as byproducts from the interactions of AmDHOP and CAC, they are the formations of ettringite, $Ca_6Al_2(SO_4)_3(OH)_{12}\cdot 26\text{-}H_2O$ and ammonium sulfate, $(NH_4)_2SO_4$.

EXAMPLE 4

Hydrothermal Treatment

Figure 3:
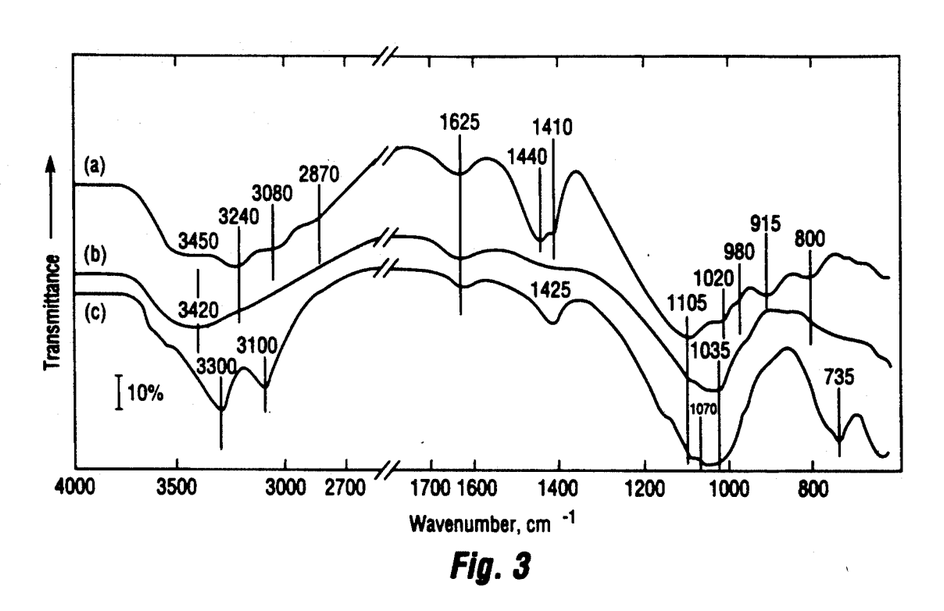
FIG. 3 is a comparison of infrared spectra of phosphate-bonded cement specimens of Example 4.

The 25° C./1-h-aged PBC specimens prepared in Example 1 were exposed in hydrothermal environments to temperatures of 200° and 300° C. FIG. 3 shows the IR spectra for (a) the 25° C./1-hour-aged specimens, (b) the 200° C./20-hour-autoclaved specimens, and (c) the 300° C./20-hour-autoclaved specimens. There are four noticeable differences as compared with FIG. 1: (1) the complete elimination of all bands due to $NH_4$ ions at 3240, 3080, 2870, 1440 and 1410 $cm^{-1}$, (2) the reduction in intensity of tetrahedral pyrophosphate-related frequencies at 1105, 1020, 980 and 915 $cm^{-1}$, (3) the disappearance of a band at 800 $cm^{-1}$ which reflects the remaining CAC reactants, and (4) the development of a strong new band at 1035 $cm^{-1}$. Since this last item relates directly to the formation of typical tetrahedral orthophosphate structure (Corbridge et al., *J. Chem. Soc.*, 493 (1954)), these results clearly verify that AmCPP, formed as a cementitious phase at room temperature was transformed into calcium orthophosphate compounds during exposure at 200° C.

From the result given in (3), some CAC is probably converted into hydration products. This finding supports the resultant IR spectrum structure of the 300° C.-autoclave samples. As is evident from FIG. 3 (c), the increased temperature contributes to the creation of the new prominent bands at 3300, 3100, 1425, 1070 and 735 $cm^{-1}$, corresponding to the formation of hydration products of CAC in the presence of the hydrothermally transformed calcium orthophosphate compounds.

EXAMPLE 5

To obtain information on the phase transformation and conversion of PBC described in Example 4, an XRD tracing, ranging from 0.356 to 0.256 nm was made for the CAC reactant, and for 25° C./1-hour-aged, 150° C./20-hour-autoclaved, 200° C/20-hour-autoclaved, and 300° C/20-hour-autoclaved PBC specimens.

Figure 4:
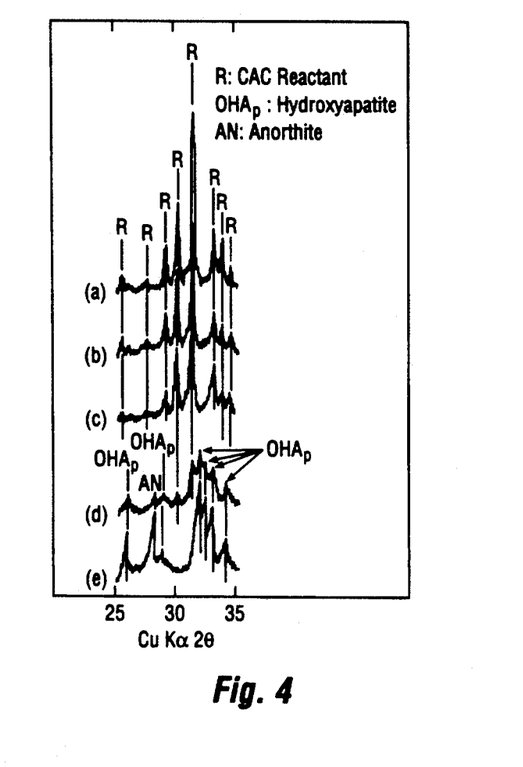
FIG. 4 illustrates XRD patterns of phosphate bonded cement specimens of Example 5.

The results from these powder samples are illustrated in FIG. 4. Comparing these with the diffraction pattern of the CAC reactant (FIG. 4a), there were no significant differences in the pattern of the 25° C./1-hour-aged samples (FIG. 4b), denoting that the AmCPP compounds formed at room temperature are essentially classified as an amorphous phase. The spacing pattern of the sample autoclaved at 150° C. (FIG. 4c) also was similar to that of the CAC.

Dramatic changes in the features of the diffraction pattern were observed from the 200° C.-autoclaved samples (FIG. 4d) in which several new spacings had developed, and the CAC-related spacings had diminished. These new spacings reveal the formation of two different crystal compounds: hydroxyapatite (HOAp), $Ca_5(PO_4)_3(OH)$ as a major phase and anorthite (AN), $CaAl_2Si_2O_8$, as a minor one. It appears from the XRD pattern (FIG. 4e) that these crystalline compounds are well formed at the autoclave temperature of 300° C., while there is entire elimination of the reactants.

EXAMPLES 6

Determination of Microstructure

An image analysis was made to examine the microstructure and the chemical components of fractured PBC surfaces using scanning electron microscopy (Model JXA-35, JEOL, Peabody, MA) coupled with energy-dispersion X-ray spectrometry (EDX) (TN-5502, Tracor Northern, Madison, Wis.).

Figure 5A:
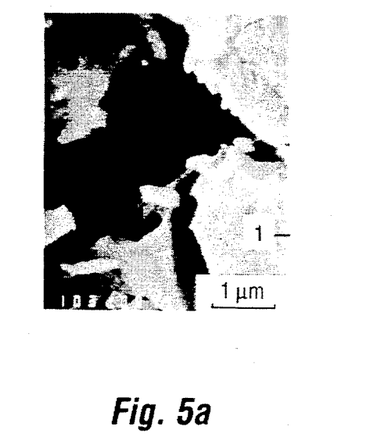
FIG. 5a is a SEM micrograph.
Figure 5B:
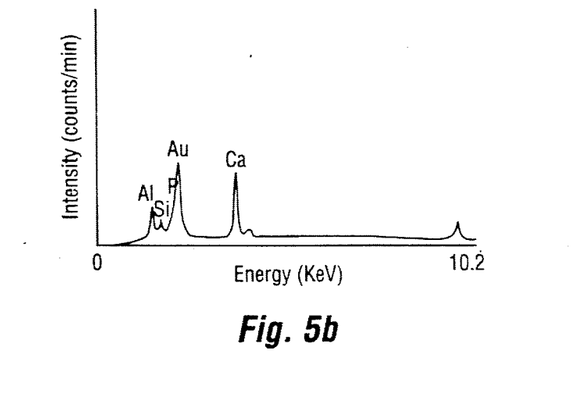
FIG. 5b is related to the micrograph of FIG. 5a and is a EDX spectrum of a fractured surface of 25° C./1-h-aged PBC of Example 6.

FIG. 5 is an overview of a SEM micrograph, coupled with EDX spectrum of a fractured surface from a 25° C./1-h-aged PBC paste sample. The microstructure developed in the rapid-setting PBC exhibits porous and fragmentary features. The EDX spectrum for the cementitious body, marked as site No. 1, represents the chemical compositions consisting of calcium, phosphorus, silicon and aluminum elements. Thus this microstructure is associated with the formation of non crystalline AmCPP in conjunction with the CAC reactants. The gold element apparent in the spectrum is related to a gold film that was deposited on the sample to obtain a clear SEM micrograph.

Figure 6A:
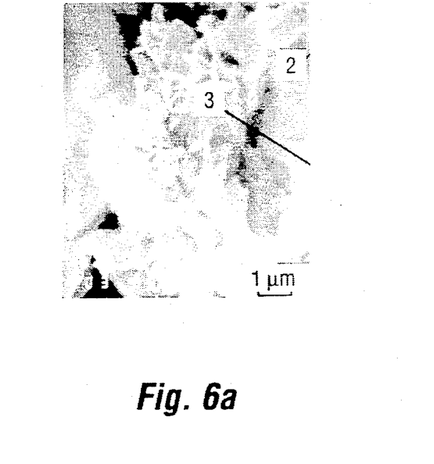
FIG. 6a is a SEM micrograph.
Figure 6B:
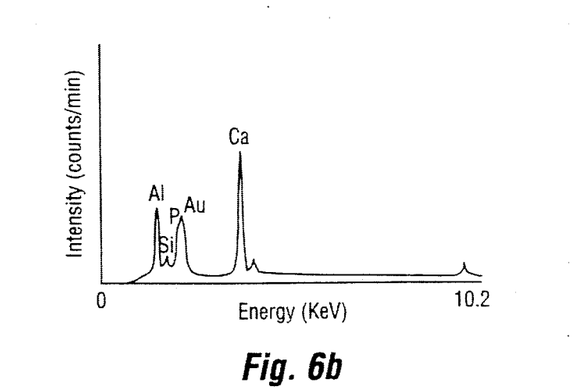
FIGS. 6b and 6c are related to the micrograph of 6a and are EDX's of microstructural components in PBC after hydrothermal treatments at 200° C.
Figure 6C:
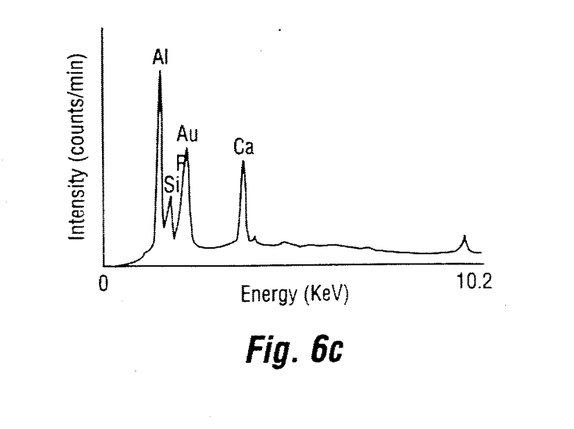

A dramatic alteration in the microstructure occurred when the samples were treated in an autoclave at 200° C., shown in FIG. 6. Comparing FIG. 5 and FIG. 6, the numerous voids existing in the pastes setting at room temperature were fully filled by the hydrothermally induced crystalline reaction products.

Figure 7:
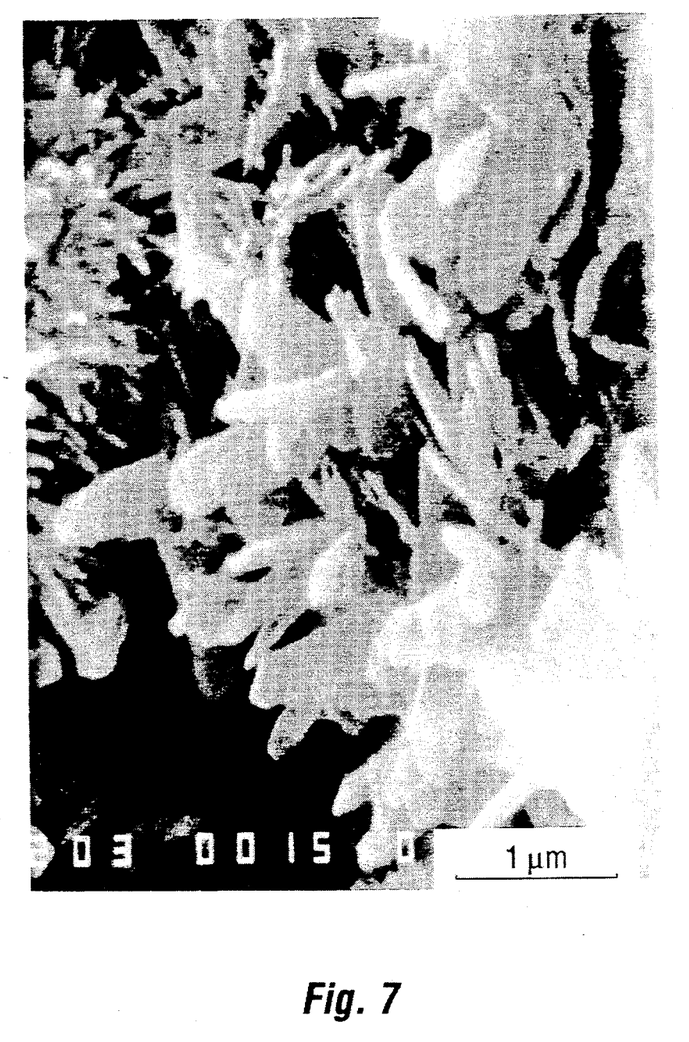
FIG. 7 is a SEM micrograph of PBC autoclaved at 300° C.

The SEM image also reveals two discernable phases: one is a noncrystalline phase with a smooth surface texture marked as site No. 2 and the other phase is an interlocking structure (site No. 3) of platelike crystals which fill the interspace in pastes. The features of the EDX spectrum from site No. 2 were similar to those of 25° C. - formed paste samples (FIG. 5), suggesting that this microstructure corresponds to the amorphous AmCPP phases containing the remaining CAC reactants. The EDX spectrum of the agglomerated area (No. 3) of interlocking crystals is characterized by an enhanced intensity of the aluminum and silicon atom peaks, seeming to suggest that the growing crystal phases that fill the spaces are composed of the combination of two different crystal components, HOAp and AN. The micromorphology which expresses the progressive growth of this interlocking crystal can be seen on the fractured surfaces of 300° C.-autoclaved specimens (FIG. 7). There is no feature indicating the presence of non-crystalline phases. The first impression of this SEM image was that the dense microstructure of the cementitious body formed by the hydrothermal treatment at 200° C. was drastically changed at 300° C. into a porous microtexture. In fact, the porosity of 300° C.-autoclaved specimens, using helium comparison pycnometry, was somewhat higher than that of 200° C. specimens.

EXAMPLE 7

Compression Strength

The hardened products of Example 1 and 4 were examined to determine the compressive strength as a function of age and hydrothermal temperature.

Compressive strength tests were performed on neat PBC specimens having a diameter of 30 mm and a length of 60 mm. In the PBC, chemical reaction products, hydrothermal-induced phase transformations and microstructure development directly affect the compressive strength of the specimens. Table II compares the strengths of the specimens prepared in atmospheric and hydrothermal environments.

TABLE II

Compressive Strength of PBC Pastes Formed in Atmospheric And Hydrothermal Environments

| Age Condition | (h) | Compressive Strength (MPa) |
|---|---|---|
| Air at 25° C. | 1 | 23.8 |
| Air at 25° C. | 4 | 25.5 |
| Air at 25° C. | 24 | 27.8 |
| Air at 25° C. | 72 | 30.3 |
| Autoclave at 150° C. | 20 | 32.7 |
| Autoclave at 200° C. | 20 | 72.8 |
| Autoclave at 300° C. | 20 | 41.6 |

Under atmospheric conditions, the rapid-setting characteristic of PBC materials provided a good strength of 23.8 MPa in only one hour. Once the strength of greater than 20 MPa is reached in the first hour, the increase in this initial strength as a function of curing age is likely to be gradual, in fact, the value of 30.3 MPa obtained from a specimen aged for 72 hours corresponded to only a 27% improvement. Nevertheless, although the body of the fast-setting PBC at room temperature has a porous structure, the formation of the amorphous ammonium calcium pyrophosphate (AmCPP) in conjunction with calcium aluminate cement (CAC) is responsible for the development of strength in the specimen even at an early setting age.

Using hydrothermal technology a superior strength of 72.8 MPa was obtained in specimens after exposure for 20 hours in an autoclave at 200° C. However, the further elevation of temperature to 300° C. seems to result in a retrogression of strength. The reasons for these findings may be as follows: the moderate growth of interlocking-type crystals consisting mainly of hydroxyapatite and anorthite, in the open spaces of the non-crystalline bodies, especially of amorphous ammonium calcium pyrophosphate, not only promotes the development of densified microstructure, but also might serve a cross-linking function directly connecting the non-crystalline phase. Thus, the formation of a microstructure combined of crystalline and non-crystalline phases plays a major role in developing the very high strength of the 200° C.-autoclaved PBC specimens. The finding that the development of high strength is due to this specific microstructure is in agreement with the results of J. Hu et al, Cement and Concrete Research, 18, 103 (1988), J. Hu et al., Journal of Materials Research, 3, 772 (1988), and R. A. Steinke et al., Materials Research Society International Meeting on Advances in Materials 13, 229 (1989). In these publications, however, the mode of formation of hydroxyapatite differed and the hydroxyapatite was derived from mixtures of calcium nitrate, phosphoric acid and silica as starting materials and calcined powders were pressed and hydrated at about 90°-300° C. In the present invention, it has been shown that an excessive crystal growth, causing the elimination of noncrystalline phases and the formation of a porous structure, resulted in a loss in strength, as was evident from the 300° C.-autoclaved specimens.

While there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

I claim:

1. A method of making a rapid-setting, phosphate-bonded cementitious material, the method comprising
providing a powdered aluminous cement in an amount of from about 80 to 20 weight percent;
providing an aqueous solution of an ammonium phosphate in an amount of from about 20 to about 80 weight percent;
combining the aluminous cement and the aqueous solution of ammonium phosphate at a temperature of from about −25° C. to 50° C. to form a mixture; and
allowing the mixture to cure to form a substantially amorphous cementitious material.

2. The method of claim 1 which further comprises hydrothermally treating the resulting amorphous cementitious material to form a phosphate-bonded, cementitious material containing hydroxyapatite crystals.

3. The method of claim 2 wherein the hydrothermal treating is at a temperature of from about 120° C. to about 300° C., for about one hour to about 3 days.

4. The method of claim 1 which further comprises casting the mixture before curing.

5. The method of claim 1 wherein the aluminous cement comprises calcium aluminate cement.

6. The method of claim 1 wherein the ammonium phosphate comprises diammonium phosphate and ammonium polyphosphate.

7. The method of claim 1 wherein the aqueous solution of ammonium phosphate comprises ammonium dihydrogen orthophosphate.

8. The substantially amorphous cementitious material formed by the method of claim 1.

9. An unsintered phosphate-bonded, hydroxyapatite crystal-containing cementitious material formed by the method of claim 2.

10. An unsintered cement composition comprising from about 80 to about 20 weight percent of a powdered calcium aluminate cement and from about 20 to 80 weight percent of an aqueous solution of an ammonium phosphate, wherein the unsintered cement has a compression strength of greater than about 20 MPa.

11. The composition of claim 10 wherein the aluminous cement comprises calcium aluminate cement.

12. The composition of claim 10 wherein said aqueous solution of an ammonium phosphate comprises an aqueous solution of diammonium phosphate and ammonium polyphosphate.

13. The composition of claim 10 wherein the aluminous cement comprises from about 70 to about 50 weight percent of the composition and the aqueous solution of an ammonium phosphate comprises from about 30 to about 50 weight percent of the composition.

14. The composition of claim 10 which further comprises an aggregate component.

15. The composition of claim 10 which further comprises a set retardant.

16. A method of making a phosphate-bonded cementitious material comprising;
providing from about 70 to about 50 weight percent of a powdered high alumina cement which comprises from about 35.0 to about 46.5 weight percent $Al_2O_3$ and from about 35.5 to about 45.0 weight percent CaO;
providing from about 30 to about 50 weight percent of an ammonium phosphate in an aqueous solution;
combining the powdered reactant and the aqueous solution at a temperature of from about $-25°$ C. to $50°$ C. to form a cement paste; and
allowing the paste to set for at least three minutes to form an amorphous cementitious material.

17. The method of claim 16 which further comprises autoclaving the resulting amorphous cementitious material at a temperature of from about $150°$ to about $225°$ C. for from about one-half hour to about three days to form a hydroxyapatite crystal-containing cementitious material.

* * * * *